Jan. 6, 1953     F. CASABONA     2,624,444
APPARATUS FOR FREE PIVOTING TRANSFER ROLLERS
Filed Feb. 25, 1950     2 SHEETS—SHEET 1
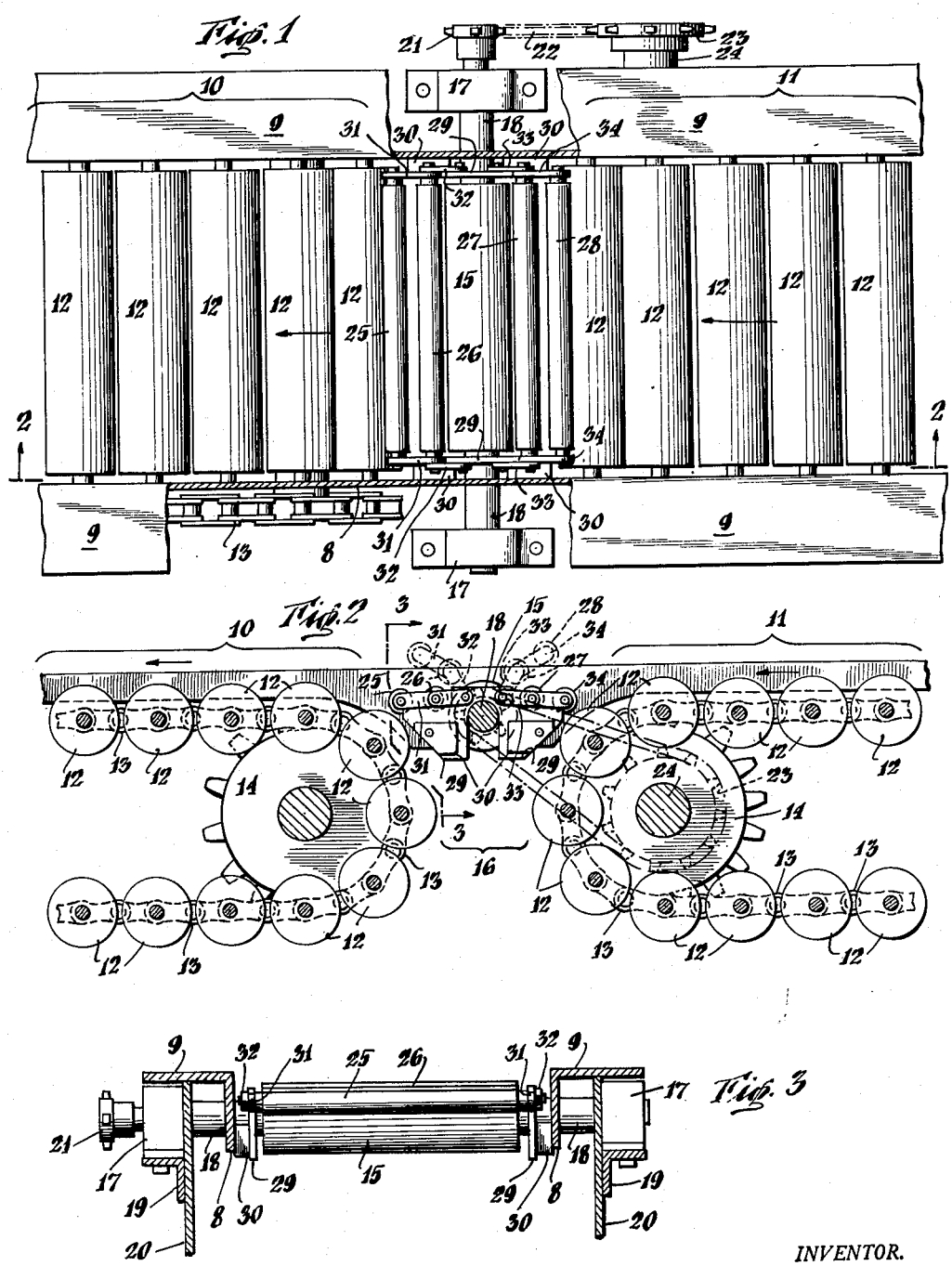
INVENTOR.
Ferdinand Casabona
BY Robert S. Dunham
ATTORNEY

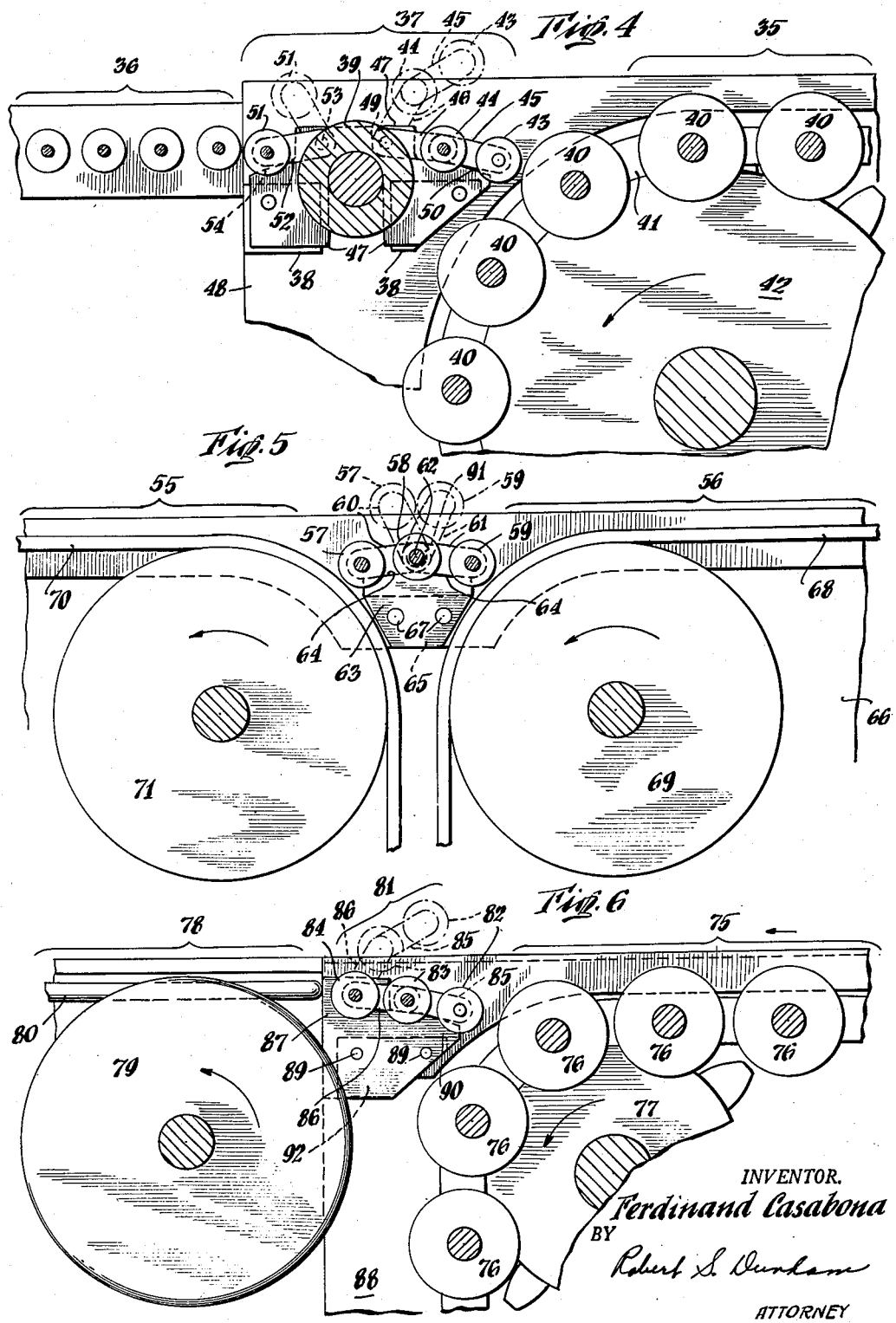

Patented Jan. 6, 1953

2,624,444

UNITED STATES PATENT OFFICE 2,624,444

APPARATUS FOR FREE PIVOTING TRANSFER ROLLERS

Ferdinand Casabona, Brooklyn, N. Y., assignor to The Jampol Company, Inc., Brooklyn, N. Y., a corporation of New York Application February 25, 1950, Serial No. 146,317

10 Claims. (Cl. 198—105)

1

This invention relates to article conveyors and is more particularly directed to a method and apparatus for bridging gaps in conveying systems.

In conveyor systems of the roller, belt, disc, and similar types, there are frequently gaps at various transitional points in the conveyor. Such gaps are found near the delivery end of a conveyor system between the power conveyor and the delivery table or idler roller run-out, or at curves in conveyor systems where the articles moves from a belt or a roller conveyor to a disc or other type curve conveyor; or between two in-line conveyors where it is found necessary, because of circumstances, to separate the system into several units. In such circumstances, if the articles being handled are relatively small or are comprised of bundles of flexible sheets, such as bundles of newspapers, there is a tendency for the articles to be drawn down and into the return mechanism of the conveyors at the gaps in the system. To aid in the transition over in these gaps, various translating platforms and intermediate power rollers have been used but such devices have not proved to be entirely satisfactory for there is a continuing tendency for the articles to be drawn down and become entangled in the return apparatus of the conveyors. When such entanglement occurs, the various translating devices which have been available have hindered the removal of the articles because the articles become wedged between the conveyor and the translating devices. Furthermore, the operator of the machine was subject to considerable danger in attempting to remove such articles for his clothing and hands might also become wedged between the moving conveyor and the fixed translating device interposed in the gap.

An important object of this invention is to provide a translating roller bridge which will facilitate the translation of articles across gaps or breaks in conveyor systems and will decrease the possibility of articles being drawn down at the end of a conveyor.

A further important object of this invention is to provide a roller translating device which is freely pivoting to permit easy access to objects which have been drawn down at a gap in the conveyor system.

Another important object of the invention is to provide a translating device for use with conveyors which will provide a high degree of protection and safety for operators.

The invention includes an apparatus which may have two or more idling rollers having sufficient axial length to accommodate articles moving along the conveyor system in which they are to be used. The rollers are rotatably mounted at their ends in pairs in link means which maintain the rollers in parallel axial relation to each other. The rollers and their bearing links may be separately supported in an independent frame interposed in the gap or break in the conveyor system or may be supported in the general frame of the conveyor system. The link means are supported on supporting ledges or seating means disposed on the inside faces of the frame upon which the links may be removably seated. Some of the links also may be pivotally connected to the side frame at the point in the gap, remote from the conveyors, so that the rollers rotatably mounted in the links adjacent to the conveyor units may be freely pivoted upward to permit the removal of articles which may have become wedged between the conveyor and the roller. The supporting or seating means have slightly downwardly curving links engaging faces to support the links in a slightly upwardly buckled condition with all the idler rollers slightly below the plane of the conveyor units and with the idler rollers adjacent the conveyor units somewhat further below the conveying plane of the conveyor units than the idler rollers remote from the conveyor units. The buckled condition of the seated links causes the idler rollers and their supporting links to freely pivot upwardly and to fold, in accordion fashion, on themselves when lateral pressure is applied from the direction of the conveyor unit. The idler rollers are of relatively small diameter so that they may be arranged in close proximity to the conveyor units and to provide more nearly continuous bridging surface over which to translate the articles carried by the conveyor system.

To describe the invention more fully, reference is made to the drawings wherein:

Fig. 1 is a plan view of a portion of a roller conveyor system with apparatus embodying the present invention interposed in the gap between two power driven roller conveyors.

Fig. 2 is a side elevation of the conveyor system taken along the line 2—2 in Fig. 1 with the side of the conveyor apparatus removed.

Fig. 3 is a sectional view taken along the line 3—3 in Fig. 2.

Figs. 4, 5, 6, are side elevations partly in section of three alternate forms of the invention.

Figs. 1, 2, and 3, illustrate a conveyor system having two power driven roller conveyor units shown generally at 10 and 11. The conveyors 10 and 11 consist of rollers 12 which are rotatably mounted on sprocket chains 13, and the chains, in turn, are supported by sprocket wheels 14 which are power driven to move the rollers 12 continuously around the sprockets 14 in the usual manner in which freely rotating power driven roller conveyors operate. The conveyors 10 and 11 are merely illustrative of one type of conveyor system wherein the apparatus of this invention is useful. Such conveyors, because of physical limitations of size or other considerations, are divided into units, and between one unit and another, gaps or breaks occur, and it is necessary to provide a device for bridging the gap. Such a bridging device, which is one embodiment of this invention, is shown in Figs. 1, 2 and 3 and consists in part of a single power driven roller 15 which may be suitably supported in the gap between the two conveyor units 10 and 11 by mounting the shaft 18 of the power driven roller 15 in suitable bearings 17 which are in turn secured by screws to the brackets 19 which are welded or otherwise suitably mounted on the main frame 20 of the conveyor apparatus. The shaft 15 may be driven through the sprocket 21, the chain drive 22 and the sprocket 23, the latter being mounted on the shaft 24 of the power driven conveyor 11.

Intermediate idler rollers 25, 26, 27, and 28 are provided to bridge the gap between the single power driven roller 15 and the power driven roller conveyor units 10 and 11. The intermediate rollers 25—28 have sufficient axial extent to accommodate articles passing over the conveyor system and have a radius in the presently illustrated form of somewhat less than one-half that of the power driven rollers 12 and 15. Rollers 25 and 26 are rotatably mounted in parallel axial relation to each other on links 31, and idler roller 26, adjacent to the power roller 15 and remote from the power driven conveyor 10, is also rotatably mounted at one end of links 32. The links may be flat metal strips of suitable size. The other end of each of said links 32 is pivotally connected to supporting bars 29. The links 31 are supported in normal position, i. e., the full-line position shown in Fig. 2 by supporting bars 29. The supporting bars 29 are spaced from the frame by filler bars 30 to permit the accommodation of links 32 between the side of the frame and the supporting bar 29. The filler bars 30 are welded or suitably mounted on the inside of the frame of the conveyor system and as shown in Fig. 3 are secured to the downward extension 8 of the feeder conveyor table top 9. The links 31 are loosely seated on the supporting bars 29 so that they may be freely lifted or pivoted out of the full-line position shown in Fig. 2 to a position such as that shown by the dash line in Fig. 2.

Similarly, rollers 27 and 28 are rotatably mounted in links 34 and roller 27 is rotatably mounted at one end of each of links 33. The other end of each of said links 33 is pivotally connected to the adjacent supporting bar 29.

In operation with both power conveyors 10 and 11 moving to the left as indicated by the arrows in Figs. 1 and 2, and the power roller 15 moving in the counter-clockwise direction as viewed in Fig. 2, an article moving from the power conveyor 11 to the power conveyor 10 moves across the idler rollers 28 and 27, then over the power driven roller 15, thereafter over the second set of idler rollers 26 and 25 and finally the articles move on to the power roller conveyor 10. The rollers 25, 26, and 27, 28, reduce the width of the gap so that the transition from one power conveyor to another is reduced to a minimum. This is in part effected by using idler rollers of reduced diameter and also in part by positioning the rollers slightly below the plane of the two power conveyors 10 and 11 and the intermediate power roller 15 so that any articles which were tending to follow the rollers 12 of the power conveyor 11 down and around the sprocket 14, carried on the shaft 24, would be scooped up and transferred to the adjacent idler roller 28.

Bridging means, such as the rollers 25, 26, and 27, 28, may be useful in various conveyor systems where it is necessary to bridge a gap between two conveyor units but they have been found of particular advantage in conveyors utilized for the conveying of bundles of newspapers which are being moved from a gathering point to a tying-in machine or other delivery point. The newspapers are loosely stacked in bundles with a bottom sheet or wrapper of newspaper or other paper, which, because of its flexible nature, might be drawn down around the sprocket wheel at the end of a conveyor unit. If, in spite of the bridging rollers 25—28, the newspaper wrapper or other paper in the stack or bundle is drawn down as the rollers 12 pass around the sprocket wheel 14, the conveyor operator may pivot the rollers 28 and 27 upward to the dash-line position shown in Fig. 2 to recover the paper which has been drawn down. It will be appreciated that, in addition to providing an easy access to the paper which has become wedged between the rollers, the free pivoting feature of the rollers 25 and 26 insures that the hands or clothing of the operator cannot become wedged between the rollers 12 and 28, thereby eliminating a serious cause of injury to the operator.

It will be noted that the link engaging faces of the supporting bars 29 have a downwardly sloping profile as viewed in Fig. 2 which is slightly arcuate so that the rollers 25 and 28 are supported at a lower level than their respective companion rollers 26 and 27. Furthermore, the arcuate link engaging faces maintain the longitudinal axes of links 31 and 32 out of alignment and similarly maintain the longitudinal axes of links 33 and 34 out of alignment, thereby insuring that the links will buckle upwardly at rollers 26 and 27 in accordion fashion and will not lock against the supporting bars when lateral pressure is exerted from the direction of the conveyor as an article is drawn down at the end of a conveyor unit.

The conveyor system illustrated in Figs. 1, 2, and 3 is designed to be operated in either direction, i. e., from left to right and from right to left, as viewed in Figs. 1 and 2. When the movement of the conveyors 10 and 11 is from left to right, it will be appreciated that the rollers 25 and 26 will serve in the same manner as rollers 27 and 28 served when the movement was from right to left.

Figs. 4, 5, and 6 illustrate alternate and modified forms embodying the invention and also illustrate several different applications of the invention in conveyor systems.

Fig. 4 shows a side view of a portion of a power driven roller conveyor, illustrated generally at 35, and an idler roller delivery table 36 with a bridging means 37 interposed in the gap between the conveyor 35 and the delivery table 36. The bridging means in this illustrated form includes a power driven roller 39 which may be suitably linked to the drive of the power conveyor 35 in much the same manner as power driven roller 15 was connected to driver means in Fig. 2. The rollers 40 of the conveyor 35 are rotatably mounted on a sprocket chain 41 and move around the sprocket wheel 42 at the end of the conveyor. Idler rollers 43 and 44 of relatively small diameter are disposed in the gap between the end of the roller conveyor 35 and the power driven roller 39. Idler rollers 43 and 44 are rotatably mounted on the link members 45 in parallel relation to each other. The roller 44 is also rotatably mounted at one end of each of side links 46. The other end of each of the links 46 is pivotally mounted at 49 to the supporting bars 47 which are mounted on the frame 48 and spaced therefrom by filler bars 38 of the power conveyor 35. The supporting bars 47 are shaped with slightly curved sloping shoulders 50 to support the links 45 in the full-line position shown in Fig. 4. It will be appreciated that the shoulders 50 of the supporting bars 47, which are curved to maintain links 45 and 46 in a slightly buckled condition, may also have an uncurved downwardly sloping profile, if the higher end of the link engaging shoulder 50 supports the pivot point between links 45 and 46 above the pivot point 49, to maintain the desired buckled condition.

Idler roller 51 is disposed in the gap between the idler roller delivery table 36 and the power driven roller 39. The roller 51 is rotatably mounted at one end of each of the links 52, and the other end of each of said links 52 is pivotally mounted at 53 to the supporting bar 47. The supporting bar 47 is provided with a shoulder 54 to support the link 52 in the full-line position shown in Fig. 4. Thus, it will be seen that the articles moving along the conveyor 35 may be translated to the idler roller delivery table 36 across the bridging means 37 which reduces the gap between the devices to a minimum.

It will be appreciated that the forms of the invention shown in Figs. 1–4 may be altered to eliminate the intermediate power driven rollers, such as, rollers 15 and 39, but it has been found that in certain applications of the invention, it is useful to interpose an intermediate power driven roller to aid in the translation of the articles across a gap or break in the conveyor system. However, when a power driven roller is not interposed in the gap, it is not necessary to have the units spaced as far apart as shown in Figs. 1–4. This will be appreciated more fully after a description of the forms of the invention shown in Figs. 5 and 6.

The bridging means illustrated in Fig. 5 is an alternative form in which the invention is contemplated and is a form which is adapted to be used between two belt conveyor units indicated generally at 55 and 56. In this form, the bridging means does not include an intermediate power driven roller but consists of small diameter idler rollers 57, 58, and 59. Idler rollers 57 and 58 are rotatably mounted in links 60 and idler rollers 58 and 59 are rotatably mounted in links 61. The shaft 62 of the idler roller 58 is journalled in the roller supporting bars 63. The links 60 and 61 are supported on the sloping shoulders 64 of the supporting bars 63 which are mounted on frame 66 by suitable means, such as, screws 67. The supporting bars 63 are spaced from the frame by suitable filler bars 65. As articles are moved along the conveyor belt 68, which is mounted on the power driven drum 69, they move across the rollers 59, 58, and 57 successively and thereafter on to the belt 70 carried on the drum 71 of the belt conveyor 55.

In Fig. 6, one end of a power driven roller conveyor is indicated generally at 75. The rollers 76 are shown moving about the power driven sprocket wheel 77 at the end of the unit. The apparatus shown generally at 78 is the end of a disc conveyor which consists of a plurality of vertically disposed rotating discs 79 with supporting rods 80 interposed between the several discs. The disc type of conveyor is suitable for conveying articles around curves in a conveyor system. In Fig. 6, the bridging means 81 is shown as interposed in the gap between the conveying units 75 and 78. The bridging means or the means for translating articles across the gap between the conveyor units includes small diameter idler rollers 82, 83, and 84. Idler rollers 82 and 83 are rotatably mounted on links 85 and rollers 83 and 84 are rotatably mounted in links 86. The links 85 and 86 may be flat strips of metal which support the rollers at their ends in substantially parallel relationship to each other. The roller 84 may also be rotatably mounted in the roller supporting bars 87, and the bars 87 may be fixed to the frame 88 of the roller conveyor 75. The supporting bars 87 may be fixed to the frame 88 by any suitable means, such as, screws 89. Filler bars 92 maintain the supporting bars 87 spaced from the frame 88 to give clearance for the links 86 which are disposed between the bars 87 and the frame 88. As an article moves from right to left in Fig. 6, that is, from the power roller conveyor 75 to the disc conveyor 78, it will be moved over the gap between the units 75 and 78 by moving over the small diameter idling rollers 82, 83, and 84 which are supported in the full-line position in normal operation of the conveyor. The support for the rollers is provided by the links 85 resting against the shoulders 90 provided on the roller supporting bar 87 and the roller 84 being mounted in the bar 87. The link supporting shoulders 90 have a downwardly curving shape so that the rollers 82, 83, and 84 are supported with their upper surfaces slightly below the plane on which the articles are conveyed by the roller conveyor 75. The rollers are also supported with the axis of roller 83 slightly above the sloping plane including the axes of rollers 82 and 84 so that when lateral pressure is exerted against the roller 82 from the direction of the conveyor 75, the rollers 82 and 83 and their associated links 85 and 86 will pivot upwardly and fold upon themselves in the manner shown by the dash line in Fig. 6.

It will be noted that in the description of several of the embodiments of the invention, it has been stated that at least one of the small diameter idler rollers forming the gap bridge is rotatably fixed to the supporting bars at the sides of the frame, or, as in the forms shown in Figs. 1 and 4, the rollers adjacent the intermediate power rollers are carried at one end on links which are in each pivotally mounted to the supporting bar fixed on the frame of the conveyor. However, it will be appreciated that desirable results can be obtained without having the rollers permanently fixed in the frame, that is, the entire group of rollers may be independently removable from the gap and may be maintained in correct spatial relationship to the conveyor units by any suitable means, such as providing recesses in the supporting bar into which at least one of the roller shafts could be removably seated. For example, a recess might be provided for use in connection with shaft 62 in Fig. 5. The recess is indicated by the dash line 91 in Fig. 5. Similarly, the pivotal connections for the links 32 in Figs. 1 and 2 may be removably seated in suitable trough-shaped recesses or suitable open-end recesses in the supporting bars 29 so that the entire group of rollers may be removed to permit access to the gap between adjoining power conveyor units.

As noted in the preceding description of the several forms of the invention, the small diameter idling rollers slope downwardly toward the conveying units and are generally below the conveying horizon when in operative position and thereby facilitate the translation of articles across gaps in conveyor systems and decrease the area in which articles may be drawn down at the end of each conveyor unit.

It will be appreciated that in addition to providing a more effective means of bridging the gap between two conveying units, the apparatus of this invention provides a new and effective means of clearing the conveying apparatus in the event articles become jammed at the end of a conveyor unit. Furthermore, this invention provides a new and effective safety device to give added protection to the operators of the conveyors.

In accordance with the provisions of the patent statutes the principles of this invention have been described together with several modes of applying those principles. However, it should be understood that the structures disclosed are merely illustrative, for the invention may be carried out by other and alternative means. Also, while it is contemplated to use the various features and elements in the combinations and relations described, some of these may be altered or modified in ways other than those suggested without departing from the spirit and scope of the invention.

What is claimed is:

1. A roller conveyor bridge for use in conveying articles over gaps in a conveying system, comprising, an intermediate power driven roller rotatably mounted and adapted to be rotated in the direction in which the adjacent conveyor units are moving, at least one idler roller positioned on either side of the intermediate power driven roller, link means adapted rotatably to support the idler rollers in substantially parallel relation to said intermediate power driven roller, means for removably seating said idler rollers, slightly below the plane of travel of articles in the conveyor system, in the gaps between the conveyor units.

2. In an article conveyor system, a transfer roller apparatus for use in conveying articles over gaps between conveyor units of the system, comprising, idler rollers, link means for rotatably supporting pairs of idler rollers at their ends slightly below the plane of the conveyor units, and side brackets having shoulders upon which the link means may be removably seated.

3. In a conveyor system having gaps between the conveyor units of the system, an apparatus for bridging the gaps and translating articles carried in the conveyor system across the gaps, comprising, at least one idler roller rotatably mounted in the gap between the conveyor units, link means provided at both ends of said idler roller adapted to rotatably support the said roller at one end of said link means, means for pivotally mounting the other end of said link means in the gap between the conveyor units and means for removably seating the first mentioned end of the link means in position so that the upper surface of the roller supported on said link means is slightly below the plane of travel of the conveyor units, and the pivotal mounting for the other end of said link means being below the plane of travel of the conveyor units.

4. In an article conveyor system, a transfer roller apparatus to translate articles over gaps between conveyor units in the conveyor system, comprising, at least two rollers of sufficient axial extent to receive articles passing over the conveyor system, link means for rotatably supporting said rollers and maintaining them in pairs in parallel axial relation to each other, and means for removably seating said roller supporting link means in a gap in a conveyor system, said seating means having a curved surface sloping downwardly toward the said conveyor units so as to support the rollers in a downwardly sloping arrangement so that the said rollers are slightly below the plane of the adjacent conveyor units.

5. In a conveyor system having gaps between the conveyor units of the system, an apparatus for bridging the gaps and translating articles carried in the conveyor system across the gaps, comprising, idler rollers, link means provided at both ends of said rollers and adapted to rotatably support adjacent idler rollers in pairs, in substantially parallel relation to each other, link support bars fixed in the frame of the conveyor system and having link engaging curved upper surfaces which are downwardly sloping at their ends adjacent the conveyor units so as to support the links and their associated rollers slightly below the plane of the conveyor units.

6. In an article conveyor system, a transfer roller apparatus to translate articles over gaps between conveyor units in the conveyor system, comprising, idler rollers, link means provided at the ends of said rollers and adapted to rotatably support adjacent idler rollers in pairs in substantially parallel relation to each other, a supporting frame, link supporting bars fixed in said frame, at least one of said rollers and the ends of the links in which it is rotatably mounted being pivotally connected to the frame above the supporting bar, said supporting bars having curved upper surfaces which are downwardly sloping at their ends adjacent the conveyor units so as to support removably the links and their associated rollers slightly below the plane of the conveyor units with those rollers adjacent the conveyor units being below those rollers remote from the conveyor units.

7. In a conveyor system having gaps between the conveyor units of the system, an apparatus for bridging the gaps and translating articles carried in the conveyor system across the gaps, comprising, idler rollers, link means provided at the ends of said rollers and adapted to support the idler rollers rotatably in pairs, in substantially parallel relation to each other, link support bars fixed in the frame of the conveyor system and having link engaging curved upper surfaces which are downwardly sloping at their ends adjacent the conveyor units so as to support the links and their associated rollers slightly below the plane of the conveyor units and with the link means maintained in an upwardly buckled condition so that the axis of one of said idler rollers remote from the conveyor unit is slightly above a plane including the axes of the rollers adjacent the conveyor units.

8. In an article conveyor system, a free pivoting transfer roller apparatus to transfer articles over gaps between conveying units in the conveyor system, comprising, at least two rollers of sufficient axial extent to receive articles passing over the conveyor system, linkage means disposed at the ends of said rollers and in which the rollers are rotatably mounted with their axes in parallel relation to each other, each two adjacent rollers being linked to a separate pair of linkage means, a frame adapted to receive said roller supporting linkage means, means for rotatably and pivotally connecting one of the rollers and the ends of the linkage means associated therewith, which are remote from the conveying units, to said frame, means for removably supporting the linkage means connected to the rollers which are adjacent to the conveying units in position so that the upper surface of said rollers are slightly below the plane of the conveyor system, the pivotal connection of the one roller and its linkage means on the frame being at a point below the upper surface of the rollers.

9. In an article conveyor system, a transfer roller apparatus to translate articles over gaps between conveying units in the conveyor system, comprising, at least two rollers of sufficient axial extent to receive articles passing over the conveyor system, means for rotatably supporting said rollers and maintaining them in parallel axial relation to each other and means for removably seating said roller supporting means in a gap between conveying units in a conveyor system and maintaining the upper surface of the rollers below the plane of the conveyor, the means for supporting the rollers and maintaining them in parallel relation include links provided at the ends of the rollers, each of the links connecting two rollers, whereby each roller may be separately pivoted.

10. In a conveyor system wherein gaps exist between the several conveyor units of the system, an apparatus for use in translating articles carried in the system across the gaps, comprising, at least one power driven roller in the gap between the conveyor units, rotatably mounted with its axis transverse to the line of travel of the articles in the conveyor system, and the upper surface of the periphery of the roller being substantially parallel to the plane of articles carried in the conveyor system, idler rollers disposed between said intermediate power driven roller and the conveyor units, link means, the idler rollers being rotatably mounted at their ends in said link means to maintain them substantially parallel to the intermediate power driven roller, means for pivotally mounting said links adjacent said intermediate power driven roller and means for removably seating the idler rollers in position between the intermediate power driven rollers and the conveyor units, slightly below the plane of travel of the conveyor system, and the pivotal mounting of the link means being below the plane of travel of the conveyor system.

FERDINAND CASABONA.

REFERENCES CITED

The following references are of record in the file of this patent:

UNITED STATES PATENTS

| Number | Name | Date |
|---|---|---|
| 770,260 | Cahill | Sept. 20, 1904 |
| 1,041,424 | Buck | Oct. 15, 1912 |
| 1,472,679 | Roddy | Oct. 30, 1923 |
| 1,772,584 | Peiler | Aug. 12, 1930 |
| 2,077,188 | Rishel | Apr. 13, 1937 |
| 2,158,865 | Sammon | May 16, 1939 |
| 2,338,359 | Sharp | Jan. 4, 1944 |